May 11, 1954 R. A. BEERS, JR 2,678,384
SQUELCH CONTROL CIRCUIT
Filed March 30, 1951
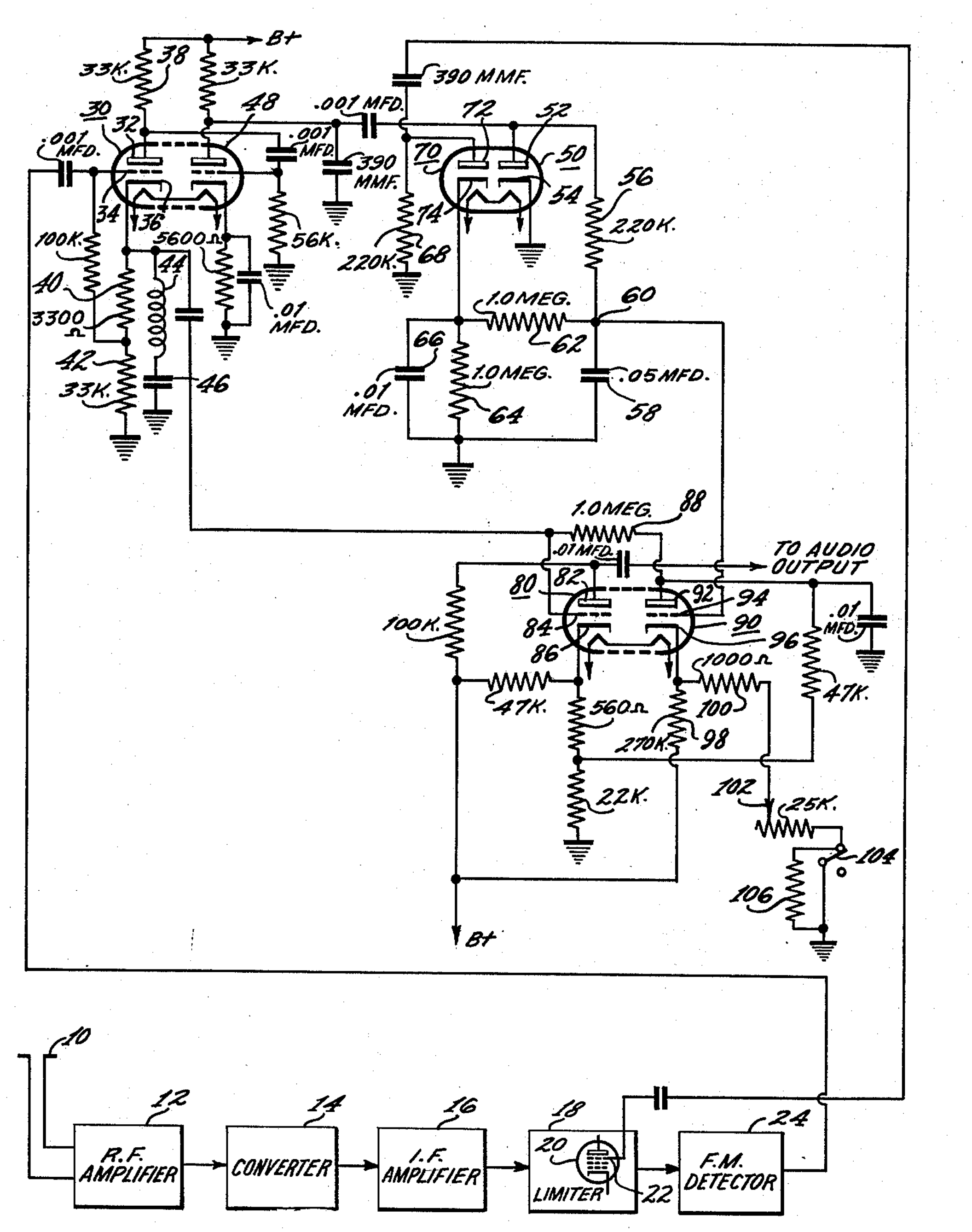
Inventor
Roy A. Beers, Jr.
By Charles H. Brown
Attorney Patented May 11, 1954 2,678,384

UNITED STATES PATENT OFFICE 2,678,384

SQUELCH CONTROL CIRCUIT

Roy A. Beers, Jr., Audubon, N. J., assignor to Radio Corporation of America, a corporation of Delaware Application March 30, 1951, Serial No. 218,345

7 Claims. (Cl. 250—20)

This invention relates to signalling by means of frequency or phase modulated waves and more particularly to an improvement in systems for obtaining selective response to signalling.

In the operation of FM mobile two-way communication systems, such as are used for highway patrol, city police or rural taxi companies, it is often desired that only certain ones of the mobile communication systems receivers receive a message, since the message is of no interest to others. Furthermore, there are often different users of the same frequency and it is desirable that the messages being transmitted be selectively received, since the messages may prove to be a distraction or annoyance to the parties not concerned. Systems have already been described wherein a carrier wave being transmitted is modulated with a tone signal or a control frequency in addition to the regular intelligence being transmitted and a filter in the receiver separates out the control frequency for utilization for a desired control purpose. Such systems are exemplified in a Patent No. 2,282,102 to H. Tunick, and another Patent No. 2,392,672 to W. R. Koch. These prior art systems all use conventional, expensive filter networks for separation of the control frequency requiring a number of tuned circuits.

It is an object of the present invention to provide a novel control frequency squelch control system.

It is a further object of the present invention to provide an inexpensive and simple control frequency squelch control system.

In the usual operation of a mobile two-way communication system, the station transmitter or mobile carrier transmitter are only on when a message is being broadcast. The receivers, however, are usually left on continuously. The receivers are therefore on when no message is being broadcast. It is therefore necessary to mute the receiver noise in the absence of a desired carrier.

It is therefore still another object of the present invention to provide a novel combination noise and control frequency squelch control system.

These and other objects of the present invention are achieved by providing a squelch control circuit for a receiver of frequency or phase modulated carrier waves wherein an audio amplifier of the receiver is biased off, except when a signal is received which includes a control tone or frequency which causes the squelch control circuit to permit the audio amplifier to amplify the audio signals.

The novel features of the invention, as well as the invention itself, both as to its organization and method of operation, will best be understood from the following description when read in connection with the accompanying drawing, which shows a circuit diagram of an embodiment of the invention used in a receiver.

Referring now to the drawing, a typical receiver includes an antenna 10 for receiving phase or frequency modulated waves, which are fed to a radio frequency amplifier 12 the output of which is fed to a converter 14 which reduces the carrier wave center frequency to an operating I. F. value. An I. F. amplifier 16 amplifies the converter output which is then applied to an amplitude limiter 18, which limits the amplitude of the I. F. amplifier output. The amplitude limiter usually consists of one or more pentode tubes 20 operated with a low D. C. resistance plate circuit and operated with a low plate voltage. In the absence of a carrier signal, a substantial noise signal may be obtained from the screen 22 of the last amplitude limiter stage. This noise signal is utilized for a purpose to be discussed subsequently herein. The output of the limiter is then applied to an FM detector 24 which may be of any well-known form and which has the function of deriving from the limiter output the modulation which was applied to the carrier at the transmitter.

The receiver, as thus far described, is conventional and known in the art. The output of the FM detector 24 is applied to the grid 34 of a first tube 30. This tube 30 has an anode load resistor 38 and a cathode load consisting of two series-connected resistors 40, 42. In parallel with the cathode load is a series-connected inductance 44, and capacitance 46 having their values selected to be series-resonant at a predetermined control frequency. These values are also such as to provide a high impedance at other frequencies. Effectively, therefore, the first tube is an amplifier with substantially 100% cathode degeneration at all frequencies except at a frequency substantially that of the control frequency. There the series-resonant circuit effectively presents a short circuit and connects the cathode 36 to ground, and the full tube gain is realized for the control frequency from grid to plate of the tube 30. On the other hand, due to the cathode degeneration of the tube, the gain for all frequencies other than the control frequency is slightly less than one. At the control frequency, in view of the short circuiting action of the resonant circuit, there is no control frequency present at the cathode output terminal. Other frequencies are present, however.

The first tube anode 32 is connected to a subsequent amplifier stage 48. Its output is applied to the anode 52 of a first diode rectifier 50 whose cathode 54 is grounded. The first diode rectifier anode 52 is also coupled through a resistor 56 to a condenser 58 and then to ground. Another resistor 62 is connected between this resistor and condenser coupling point 60, which serves as an output terminal 60, and the junction of another resistor 64, condenser 66 and the cathode 74 of a second diode rectifier 70. The other ends of the latter resistor 64 and condenser 66 are connected to ground. The second diode rectifier anode 72 is connected through a resistor 68 to ground and also to the screen 22 of the last amplitude limiter stage 20. The combination of the resistors 56, 62, 64, 68 and condensers 58, 66 will readily be recognized as forming a D. C. filter circuit, with the first diode rectifier 50 being connected thereto to provide a negative voltage at the output terminal 60 and the second diode rectifier 70 being connected thereto to provide a positive voltage at the output terminal 60.

A second electron discharge tube 80 has its grid 84 connected through a condenser to the cathode 36 of the first tube. The second tube grid 84 is also connected, through a resistor 88 to the anode 92 of a third electron discharge tube 90. The third tube grid 94 is connected to the D. C. filter output terminal 60. The cathode 96 of the third tube is connected to the B+ source through a resistor 98. Another resistor 100 in series with a potentiometer 102, and a second resistor 106 connects the cathode 96 to ground. A switch 104 is connected so that when closed it shunts resistor 106. The cathode 86 of the second tube 80 is also connected to the B+ source through a voltage dropping resistor. The values of the resistors connected to the second and third tube cathodes 86, 96 together with the adjustment of the potentiometer are such that the third tube 90, in the absence of a control frequency signal being applied to the first tube grid 34, draws current. In doing so, the potential applied to the second tube grid 84 is such as to render the second tube 80 non-conducting. Therefore, any signal applied to its grid 84 will not be amplified.

When a signal is received, which includes the control frequency, the control frequency is separated from the signal at the first tube 30 and subsequently rectified and applied as a negative voltage to the grid 94 of the third tube 90. The third tube is thereby rendered non-conducting. This causes the voltage at its plate 92 to rise up and thereby a more positive potential is applied to the second tube grid 84. The second tube 80 is thereby rendered conducting and the signal from the first tube cathode 36, less the control frequency, is amplified by the second tube and applied to a subsequent audio amplification stage and then reproduced. It may therefore be seen that the audio amplifier and thereby the FM receiver is unsquelched when the proper control frequency and carrier is received.

When a carrier is not being received, the noise on the amplitude limiter screen 22 is rectified by the second rectifier tube 70 and applied to the third tube grid 94 as a positive voltage, thus maintaining the receiver squelched. Upon a carrier wave being received, the noise is suppressed and the positive voltage resulting therefrom becomes less positive, but not so much so that the third tube is cut off. However, when a control frequency is received in addition to a carrier, the first rectifier 50 causes a negative voltage to be developed therefrom which is sufficient to overcome the reduced positive noise voltage and to increase the bias on the third tube to render the third tube non-conducting. If a sufficient noise signal were received and passed so that it might be amplified by the first tube, even with the selective filter, this same noise would also be applied to the second rectifier to a greater degree than the noise is applied to the first rectifier, in which case the two control voltages due to noise would cancel, leaving the receiver squelched against noise. If the signal to noise level is sufficient to produce an intelligible signal, there is more control voltage present due to the control frequency than control voltage due to noise, and the receiver is unsquelched.

The control frequency may, for convenience and to lessen the effect of a "hole" in the transmitted band of audio frequencies, be placed at the top or bottom of the band. As an example, a favored transmitted audio band in a mobile communication system is 300 to 3000 cycles. The control frequency may be made either 300 or 3000 cycles or close to those frequencies, and applied as a steady tone at the transmitter along with the audio signals. If desired, the switch 104 in circuit with the cathode 96 may be made to open when response is made at the mobile transmitter either by connection to the switch of a press to talk microphone or by a lifting of a receiver connected to the set off a hook. The switch 104 is connected across a resistor 106 the value of which is such as to cause a bias to be applied to tube 92 whereby it is rendered non-conducting even in the absence of a control frequency. However, should noise occur due to temporary carrier signal not occurring as happens in normal mobile communications, the normal noise signal squelch operation still occurs. Thus, by opening switch 104 the squelch control is rendered inoperative to control frequency but still remains operative to noise squelch control. In this event, the third tube cannot conduct, the second tube will remain conductive as long as the switch is open, and the control frequency at the transmitter may be omitted as long as the switch remains open.

For the purposes of illustration of an operative embodiment of the invention and not as any limitation thereon, some typical values for the condensers and resistors are shown on the drawing. The triode tubes shown may be 6SL7 or any other audio amplifier tube. The value of the resonant circuit inductor and capacitor is determined by the control frequency, but these should preferably have a high Q.

From the foregoing description it will be readily apparent that there has been provided a novel, simple and inexpensive control frequency squelch control system.

What is claimed is:

1. A control frequency operated squelch control system comprising a first electron discharge tube having anode, cathode and control grid electrodes, means to apply a signal to said first tube grid, an anode load resistor connected to said first tube anode, a cathode load resistor connected to said first tube cathode, means to present substantially a short-circuit to said cathode load resistor at said control frequency and to present at other frequencies a high impedance to said cathode load resistor when compared with its resistance value, a second electron discharge tube having anode, cathode and grid electrodes, said first tube cathode being coupled to said second tube grid, means to maintain said second tube non-conductive, and means to apply output from said first tube anode load resistor to said last named means to render said last named means inoperative when said control frequency is present in said signal applied to said first tube grid to permit said second tube to amplify said signal.

2. A control frequency operated squelch control system as recited in claim 1 wherein said means to present substantially a short circuit to said cathode load resistor at said control frequency and to present at other frequencies a high impedance to said cathode load resistor comprises a series-connected inductance and capacitance having their values selected to be series resonant at said control frequency and to have a high impedance at said other frequencies.

3. A control frequency operated squelch control system comprising a first electron discharge tube having anode, cathode and control grid electrodes, means to apply a signal to said first tube grid, an anode load resistor connected to said first tube anode, a cathode load resistor connected to said first tube cathode, circuit means connected in parallel with said cathode load resistor to present substantially a short circuit to said cathode load resistor at said control frequency and to present a high impedance compared to said cathode load resistor value at frequencies other than said control frequency, a rectifier connected to the anode load resistor of said first tube, a filter network connected to receive said rectifier output, a second electron discharge tube having anode, cathode and grid electrodes, said first tube cathode being coupled to said second tube grid, means to maintain said second tube non-conductive, and means to apply output from said filter network to said last-named means to render said last-named means inoperative when said control frequency is present in the signal applied to said first tube grid to permit said second tube to become conductive and amplify said signal.

4. A control frequency operated squelch control system comprising a first electron discharge tube having anode, cathode and grid electrodes, means to apply a signal to the grid of said first tube, a cathode load resistor connected in series with the cathode of said first tube, a series connected inductance and capacitance also connected in series with the cathode of said first tube, said series connected inductance and capacitance having their values selected to be series resonant at said control frequency and to provide a high impedance compared to said cathode load resistor value at frequencies other than said control frequency, an anode load resistor connected in series with the anode of said first tube, rectifier means coupled to said anode load resistor for rectifying any voltage appearing thereacross, second and third electron discharge tubes each having anode, cathode and grid electrodes, the grid of said second tube being coupled to the cathode of said first tube and the anode of said third tube, means to apply a bias to said third tube to maintain said third tube conducting, whereby the output applied from said third tube anode to said second tube grid maintains said second tube substantially non-conducting, and means to apply output from said rectifier means to said third tube grid to render said third tube substantially non-conducting when said signal includes said control frequency whereby said second tube is rendered conducting and the signal on said first tube cathode, exclusive of said control frequency, is amplified by said second tube.

5. A control frequency operated squelch control circuit for a frequency modulation receiver of the type adapted to receive frequency or phase modulated carrier waves which may include said control frequency as one of the modulating frequencies and adapted to provide a noise signal in the absence of a desired carrier wave, said squelch control circuit comprising a first electron discharge tube having anode, cathode and control grid electrodes, means to apply the detected modulating frequencies of said frequency or phase modulated carrier wave to said first tube grid, an anode load resistor connected to said first tube anode, a cathode load resistor connected to said first tube cathode, means to present substantially a short circuit to said cathode load resistor at said control frequency and to present at other frequencies a high impedance to said cathode load resistor when compared with its resistance value, a second electron discharge tube having anode, cathode and grid electrodes, said first tube cathode being coupled to said second tube grid, means to maintain said second tube non-conductive, means to apply the output from said first tube anode load resistor to said last-named means to render said last-named means inoperative when said control frequency is applied to said first tube grid to permit said second tube to become conductive, and means to apply said noise signal to said maintaining means to render it operative to maintain said second tube non-conductive.

6. A control frequency operated squelch control circuit for a frequency modulation receiver of the type adapted to receive frequency or phase modulated carrier waves which may include said control frequency as one of the modulation frequencies and adapted to provide a noise signal in the absence of a desired carrier wave, said squelch control circuit comprising a first electron discharge tube having anode, cathode and control grid electrodes, means to apply the detected modulating frequencies of said frequency or phase modulated carrier wave to said first tube grid, an anode load resistor connected to said first tube anode, a cathode load resistor connected to said first tube cathode, means to present substantially a short circuit to said cathode load resistor at said control frequency and to present at other frequencies a high impedance to said cathode load resistor when compared with its resistance value, a second electron discharge tube having anode, cathode and grid electrodes, said first tube cathode being coupled to said second tube grid, means to maintain said second tube non-conductive, first rectifier means to which said noise signal is applied, second rectifier means to which said first tube anode load resistor is coupled, a D.-C. filter network, means to couple said first rectifier means to said filter network to provide a voltage of one polarity at the output of said network in the presence of a noise signal, means to couple said second rectifier means to said filter network to provide a voltage of opposite polarity at the output of said network in the presence of said control frequency, means to couple the output of said filter network to said means to maintain said second tube non-conductive, to render said maintaining means inoperative only when said voltage of opposite polarity predominates, to permit said second tube to become conductive.

7. A control frequency operated squelch control circuit as recited in claim 6 wherein said means to present substantially a short circuit to said cathode load resistor at said control frequency and to present at other frequencies a high impedance to said cathode load resistor when compared with its resistance value comprises a series-connected inductance and capacitance connected in parallel with said cathode load resistor and having their values selected to be series resonant at said control frequency and to have a high impedance at said other frequencies.

References Cited in the file of this patent

UNITED STATES PATENTS

| Number | Name | Date |
|---|---|---|
| 2,065,826 | Roosenstein et al. | Dec. 29, 1936 |
| 2,154,888 | Black | Apr. 18, 1939 |
| 2,239,915 | Hunt | Apr. 29, 1941 |
| 2,250,596 | Mountjoy | July 29, 1941 |
| 2,281,312 | Krist | Apr. 29, 1942 |
| 2,392,672 | Koch | Jan. 8, 1946 |
| 2,479,305 | Brown | Aug. 16, 1949 |
| 2,546,987 | Eannarino | Apr. 3, 1951 |
| 2,596,138 | Feiner | May 13, 1952 |